(12) United States Patent
Maletsky et al.

(10) Patent No.: US 10,311,005 B2
(45) Date of Patent: Jun. 4, 2019

(54) MESSAGE TRANSLATOR

(71) Applicant: Atmel Corporation, San Jose, CA (US)

(72) Inventors: Kerry Maletsky, Monument, CO (US);
Nicolas Schieli, Los Gatos, CA (US);
Timothy Grai, Oxford, MI (US)

(73) Assignee: Atmel Corporation, San Jose, CA (US)

( * ) Notice: Subject to any disclaimer, the term of this patent is extended or adjusted under 35 U.S.C. 154(b) by 353 days.

(21) Appl. No.: 15/130,656

(22) Filed: Apr. 15, 2016

(65) Prior Publication Data

US 2017/0300444 A1 Oct. 19, 2017

(51) Int. Cl.
G06F 13/38 (2006.01)
G06F 13/40 (2006.01)
G06F 13/42 (2006.01)
H04L 12/40 (2006.01)

(52) U.S. Cl.
CPC ...... *G06F 13/4027* (2013.01); *G06F 13/4221* (2013.01); *H04L 2012/40215* (2013.01)

(58) Field of Classification Search
CPC .................. H04L 1/0038–1/0031; H04L 9/32

USPC ........................................................ 710/30
See application file for complete search history.

(56) References Cited

U.S. PATENT DOCUMENTS

2014/0328357 A1* 11/2014 Fredriksson .......... H04J 3/0614
370/520
2016/0344552 A1* 11/2016 Sharma ................. H04L 9/3242

* cited by examiner

*Primary Examiner* — Ilwoo Park
(74) *Attorney, Agent, or Firm* — Fish & Richardson P.C.

(57) ABSTRACT

Systems, methods, circuits and computer-readable mediums for a network message translator are disclosed. In an embodiment, a device includes a host processor and a translator. The host processor is configured to process messages and the translator is operable to: receive a first message from the host processor, the first message having a first frame format that is associated with a data time window; translate the first message into a first translated message having a second frame format such that the first translated message includes additional bits based on the second frame format; and sending the first translated message on a bus based on the second frame format such that the first translated message is sent on the bus during the data time window.

20 Claims, 3 Drawing Sheets

MESSAGE TRANSLATOR

TECHNICAL FIELD

The subject matter of this disclosure relates generally to message translators.

BACKGROUND

Controller Area Network (CAN) 2.0 is a message-based network protocol that allows nodes (e.g., microcontrollers, electronic control units (ECUs)) to communicate with each other over a two-wire bus without a central host computer. CAN Flexible Data (FD) 1.0 has a frame format that allows a different data length and faster bit rate than CAN 2.0. CAN FD 1.0 is compatible with CAN 2.0, allowing CAN FD 1.0 devices and CAN 2.0 devices to communicate over the same bus. Neither CAN 2.0 nor CAN FD 1.0 were designed to support security features for applications. Rather, applications are expected to use their own security features to authenticate nodes. For some applications (e.g., automotive applications), where there are many methods to access the network, authentication of nodes is desirable. In an example scenario, there may be many nodes in a network that are designed by different suppliers, thereby making it difficult for a single entity to modify the nodes of a network to include security features for authentication.

SUMMARY

This specification describes systems, methods, circuits and computer-readable mediums for a network message translator.

In an embodiment, a device includes a host processor and a translator. The host processor is configured to process messages and the translator is operable to: receive a first message from the host processor, the first message having a first frame format that is associated with a data time window; translate the first message into a first translated message having a second frame format such that the first translated message includes additional bits based on the second frame format; and sending the first translated message on a bus based on the second frame format such that the first translated message is sent on the bus during the data time window.

In an embodiment, a non-transitory, computer-readable storage medium has instructions stored thereon, which, when executed by one or more processors, causes the one or more processors to perform operations comprising: receiving, by a translator, a first message from a host processor, the first message having a first frame format that is associated with a data time window; translate, by the translator, the first message into a first translated message having a second frame format such that the first translated message includes additional bits based on the second frame format; and sending the first translated message on a bus based on the second frame format such that the first translated message is sent on the bus during the data time window.

In an embodiment, a method comprises: receiving, by a translator in a message-based network, a first message from a host processor of the network, the first message having a first frame format that is associated with a data time window; translating, by the translator, the first message into a first translated message having a second frame format such that the first translated message includes additional bits based on the second frame format; and sending, by a transceiver of the network, the first translated message on a bus of the network based on the second frame format such that the first translated message is sent on the bus during the data time window.

DETAILED DESCRIPTION

Example System

In the disclosed embodiments, a network message translator is disclosed that operates in the physical layer (PHY) of a network. A message in a first frame format according to a first network protocol is translated to a second frame format according to a second network protocol and transmitted on a network bus at a faster bit rate than specified by the first network protocol. The second frame format allows additional data to be added to the message (e.g., security data) while preserving a data time window specified by the first network protocol.

Figure 1:
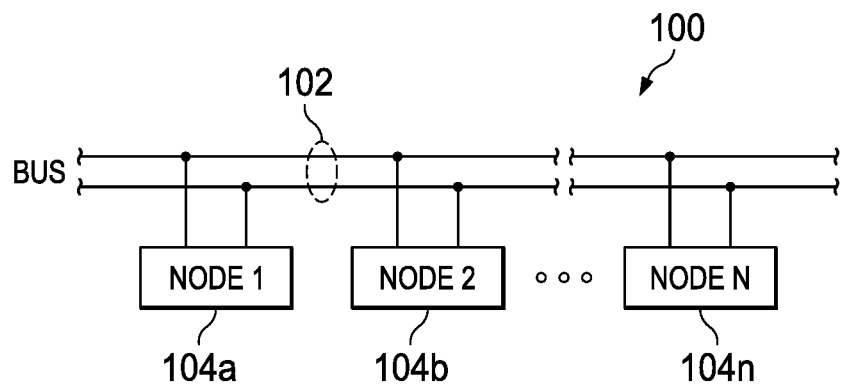
FIG. 1 is a block diagram of an example network, according to an embodiment.

FIG. 1 is a block diagram of an example network, according to an embodiment. In an embodiment, network 100 includes bus 102 and nodes 104*a*-104*n*. Bus 102 is two-wire bus terminated by resistive elements (e.g., 120 Ohm resistors). An example network 100 is CAN, which is a network topology used in automotive and other applications. In the description that follows, frequent reference is made to CAN and CAN FD networks. The disclosed network message translator, however, is applicable to any network that adds security data or other information to a message, frame or packet without violating a data time window constraint or bit rate specified by a network protocol.

CAN includes multiple abstraction layers including an application/object layer, a transfer layer and a PHY layer. The transfer layer receives messages from the PHY layer and transmits those messages to the application/object layer. The transfer layer is responsible for bit timing and synchronization, message framing, arbitration, acknowledgement, error detection and signaling a fault confinement. The PHY layer specifies electrical aspects of the network such as, for example voltage, current and number of conductors. CAN has four frame types. A data frame contains node data for transmission, a remote frame requests the transmission of a specific node identifier, an error frame is transmitted by any node in response to an error detection and an overload frame is a frame to inject a delay between a data frame and/or remote frame. The data frame has a base frame format (11 identifier bits) and an extended frame format (29 identifier bits). CAN uses a lossless bit-wise arbitration method of contention resolution between nodes that allows nodes be synchronized to sample every bit on the bus at the same time.

Figure 2:
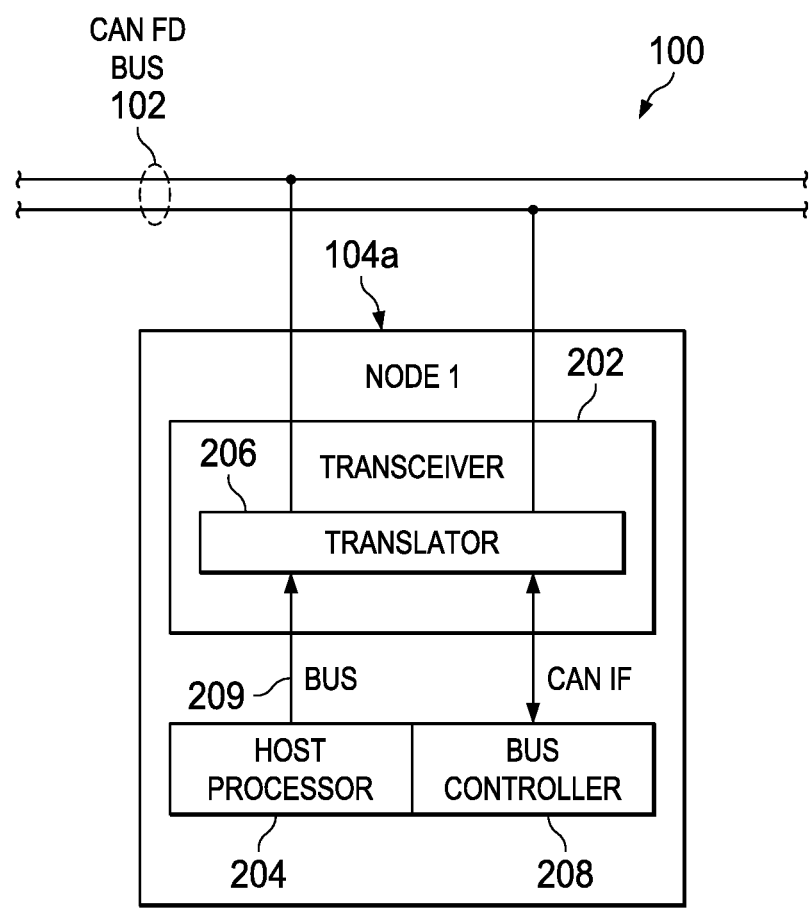
FIG. 2 is a block diagram of an example node of the network of FIG. 1, according to an embodiment.

FIG. 2 is a block diagram of an example node of the network 100 of FIG. 1, according to an embodiment. Each of the nodes 104a-104n coupled to bus 102 can send and receive messages on bus 102. Nodes 104a-104n can include a variety of devices, including but not limited to: microcontrollers, sensors, actuators, electronic control units (ECUs) and other control devices. An example node 104a includes transceiver 202, host processor 204, translator 206 and bus controller 208.

Host processor 204 (e.g., a microcontroller unit) interprets received messages and determines messages to transmit. Bus controller 208 stores received serial bits in cache received from bus 102 until an entire message is stored. The message can be fetched by host processor 204 in response to an interrupt request from bus controller 208. Bus controller 208 includes circuitry (e.g., a shift registers) that transmits and receives bits serially to and from bus 102 when bus 102 is free. Transceiver 202 includes circuitry (receiver, transmitter) that converts a bit stream received from bus 102 from electrical levels used by bus 102 to electrical levels used by bus controller 208 and may also include short circuit protection. Transceiver 202 coverts a bit stream received from bus controller 208 from electrical levels used by bus controller 208 to electrical levels used by bus 102. Translator 206 translates the bit stream from a first frame format associated with a first network protocol to a second frame format associated with a second network protocol and vice-versa. For example, the first network protocol can be CAN 2.0 (hereafter "CAN") and the second network protocol can be CAN FD 1.0 (hereafter "CAN FD"). In an embodiment, the first network protocol uses a first bit rate (e.g., 500 Kbps) and the second network protocol uses a second bit rate that is faster than the first bit rate (e.g., 2.5625 Mbps).

In an embodiment that uses a CAN, a message can includes an identifier (ID), which represents a priority of the message, a data payload, an error detection/correction code, an acknowledge [ACK] slot and overhead data. CAN FD extends the length of the data payload from 8 data bytes to 64 data bytes per message or frame. The message is transmitted serially onto bus 102 using a non-return-to-zero (NRZ) frame format and may be received by nodes 104a-104n. Message collision is avoided by having each node as it transmits its message ID look at other message IDs on the bus. If there is a conflict with a higher priority message ID (e.g., one with a lower number) then the higher priority message will hold the signal on the bus down (a zero bit is dominant) and the lower priority node will stop transmitting on the bus.

Figure 3:
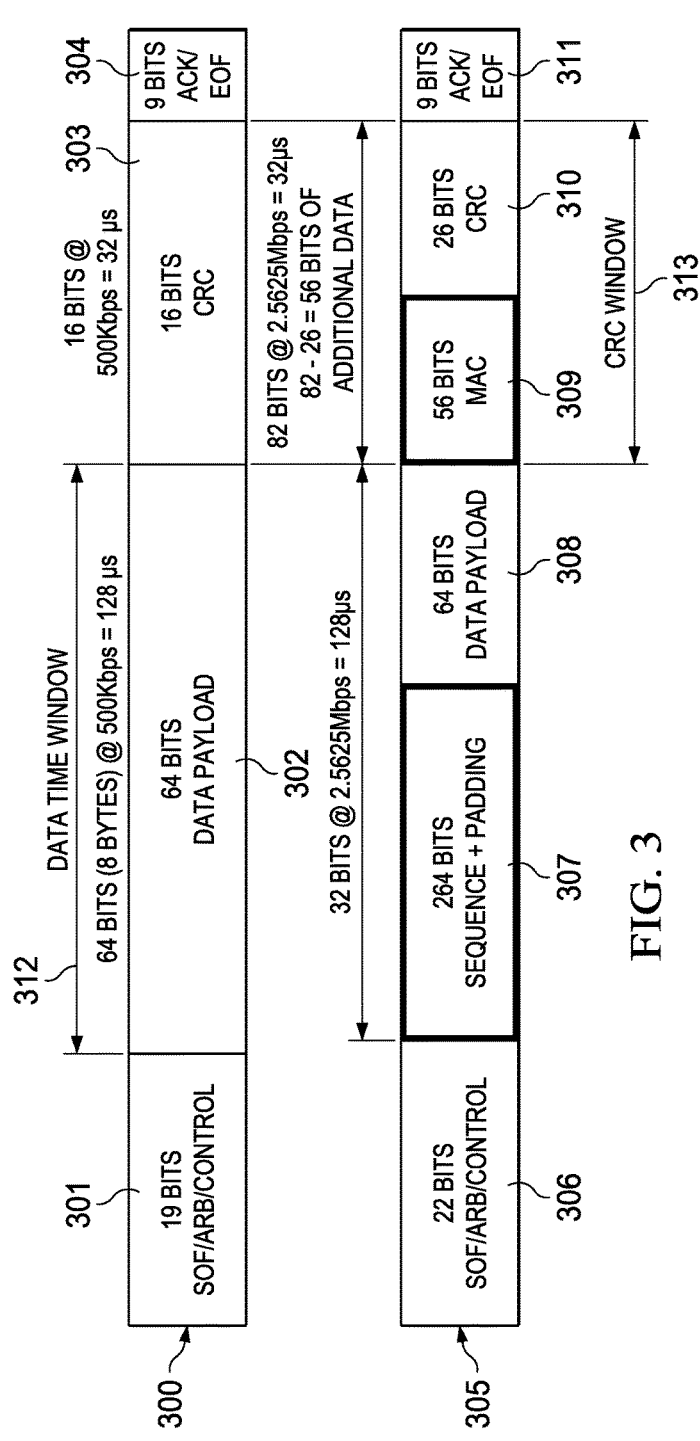
FIG. 3 illustrates an example translation of a message from a first frame format to a second frame format, according to an embodiment.

FIG. 3 illustrates translation of a data portion of a message from a first frame format to a second frame format, according to an embodiment. In some applications (e.g., automotive applications), there is a need for translation between nodes that share the same bus to transmit and receive messages using different network protocols or different versions of the same network protocol. Once reason for translation is the desire to include security information in a message without having to redesign bus endpoints or the entire network.

In the example shown, CAN message 300 includes control fields 301, 304, data payload 302 and CRC field 303. Control field 301 includes a start-of-frame (SOF) bit, 11 ID bits, a remote transmission request (RTR) bit, an identifier extension (IDE) bit, a reserved bit (r0) and 4 data length code (DLC) bits. The DLC bits indicate the number of bytes of data to be transmitted. Data payload 302 includes 64 bits (8 bytes). CRC field 303 includes 15 bits and 1 delimiter bit. Control field 304 includes an Acknowledge (ACK) slot bit, an ACK delimiter bit and 7 end-of-frame (EOF) bits. For a CAN implementation having a nominal bit rate of 500 Kbps data time window 312 is 128 μs and CRC time window 313 is 32 μs. In an embodiment, the reserved bit r0 indicates whether the message is a CAN message or a CAN FD message.

In the example shown, CAN FD message 305 includes control fields 306, 311, sequence 307, data payload 308, security field 309 and CRC field 310. Control field 306 includes a start-of-frame (SOF) bit, 11 ID bits, an RTR bit, an IDE bit, a reserved bit (r0) and 4 DLC bits. Sequence field 307 includes 264 bits. In an embodiment, the bits in sequence field 307 represent a binary counter and pad bits are added to fill out the frame and ensure bit alignment. Other types of counters can include but are not limited to linear feedback shift register (LFSR) counter, Gray code counter and the like. Data payload 308 includes 64 data bits (8 bytes). Security field 309 includes 56 bits (e.g., a message authentication code (MAC) address). CRC field 310 includes 25 CRC bits and 1 delimiter bit. Control field 311 includes an ACK slot bit, an ACK delimiter bit and 7 EOF bits. For a CAN FD implementation with a nominal bit rate of 2.5625 Mbps data time window 312 is 128 μs and CRC time window 313 is 32 μs, which is the same as the CAN data and CRC time windows. Note that the frame format of message 305 allows for adding additional bits. In the example shown, the additional bits comprise security data. The sequence bits in sequence field 307 (e.g., a binary counter) prevent relay attacks by ensuring that messages arrive to a receiving node in the correct order and that the messages are not copied and retransmitted at a later time by an unauthorized transmitter. The MAC bits in security field 309 ensure that the message has not been modified between transmitting and receiving nodes by an unauthorized transmitter.

Comparing messages 301, 305 it is noted that the messages have different bit frame formats but preserve the data and CRC time windows 312, 313. For example, message 300 has a 64 bit data payload 302 spanning a 128 μs data time window 312 and a 16 bit CRC field 303 spanning a 32 μs CRC time window 313. By comparison, message 305 has a 64 bit data payload 308 with an additional 264 bits in a sequence field 307 and a 128 μs data time window 312 and a 26 bit CRC field 310 with an additional 56 MAC bits in security field 309 spanning a 32 μs CRC time window 313. The data and CRC time windows 312, 313 are the same length for messages 300, 305 but each time window in message 305 includes additional bits. The length of data and CRC time windows 312, 313 are preserved because message 305 is transmitted at a higher bit rate on CAN FD bus 102, which allows for more bits to be transmitted on CAN FD bus 102 in the same amount of time, i.e., 128 μs. For CAN and CAN FD the nominal bit rates depend on the length of the bus (e.g., 500 Kbps for 110 meters).

Referring again to FIG. 2, host processor 202 is configured to process CAN messages received from bus controller 208 over a CAN interface (IF). For host processor 202 to operate on CAN FD messages without modification, translator 206 replicates the electrical levels on bus 102 within the data time window to allow host processor 202 to handle arbitration and error detection. For example, translator 206 can retrieve an error code (e.g., CRC bits) from the message and process the error code to determine if the message is valid. The error code can be re-calculated by translator 206 to ensure that the proper error code is processed by host processor 202.

Adding Information to Messages

In an embodiment, translator 206 includes logic operable to calculate and/or verify the security information embedded in a CAN-FD message frame. This logic can include symmetric or asymmetric cryptography data and may include tamper/intrusion and/or other hardware protection countermeasures. Some CAN-FD messages may be intercepted by translator 206 for communications directly to an internal security block in translator 206 for setup, personalization, verification or other purposes. In an embodiment, some messages on bus 102 are in CAN 2.0 frame format and do not have additional bits added (e.g., messages with the reserved bit not set to indicate a CAN 2.0 message). For these messages, translator 206 couples host processor 102 directly to bus 102 and does not perform translation. Translator 206 can include in a local cache a list of CAN message types which are not secure and therefore need not be modified by translator 206.

In an embodiment, when receiving a message, some of the message bits will be sent to host processor 202 during the time the sequence field 307 and security field 309 are being received by transceiver 208. If the sequence field 307 and security field 309 are verified, then the CRC bits are re-calculated and sent to host processor 202. If verification fails, then an error frame is transmitted on bus 102. Any algorithm can be used for generating the bits in sequence field 307 and security field 309. In an embodiment, sequence field 307 stores a 4 byte binary counter and the security field 309 stores a 56 byte Advanced Encryption Standard (AES)-Cipher-based Message Authentication Code (CMAC) value. The sequence field 307 could be longer or shorter depending on the application. Security field 309 could include bits generated by Hash-based Message Authentication Code (HMAC) or other cryptographic algorithm (e.g., CBC-MAC). Bus faults that span the entire message (e.g., when the bus is open/shorted) can be detected and handled by host processor 202 during processing of the control field 306 without starting the translator 206.

An alternate method can be used during transmission since the bits on CAN FD bus 102 are transmitted on CAN FD bus 102 at a faster rate (e.g., 2.5625 Mbps) then the bits are made available from host processor 202 on the CAN 2.0 interface. Since the sequence bits do not depend on the message itself these bits can be transmitted on the CAN FD bus 102 while the message is being received by translator from host processor 202 across the CAN interface (IF).

In an embodiment, the sequence bits and pad bits can be placed on CAN FD bus 102 during an initial portion of the data time window 312. When sufficient bits have been received over the CAN IF the entire message is transmitted by transceiver 202 over CAN FD bus 102 with the final bit of the message being nearly concurrent on the two busses. During the CAN 2.0 CRC time window 313, both the final security bits and then subsequently the CAN FD CRC bits are transmitted on bus 102 such that the final bit of the CAN CRC bits nearly lines up with the final bit of the CAN-FD CRC bits.

In an embodiment, translator 206 is provided with a message to be transmitted prior to the beginning of the transmission on CAN FD bus 102. This could be an out-of-band transfer on a separate and independent bus 209 connecting host processor 202 and translator 206, such as a Serial Peripheral Interface (SPI) bus, Inter-Integrated Circuit (I2C) bus or other bus. Translator 206 computes the security information so that the message is ready to be placed on CAN FD bus 102 concurrently with the first data bit being received by translator 206 over the CAN interface. Translator 206 can cache the messages and match the control fields 306 with the control fields 306 appearing on CAN FD bus 102 so that the CAN interface and CAN FD bus 102 remain in synchronization.

In an embodiment, the length of the message can be extended so that the message on CAN FD bus 102 is longer than the CAN data time window 312 with the extra time used for security byte calculation. This may need caching and/or other mechanism to handle the scenario where host processor 202 has already started sending the next message prior to the completion of the now extended data time window of the original message.

Figure 4:
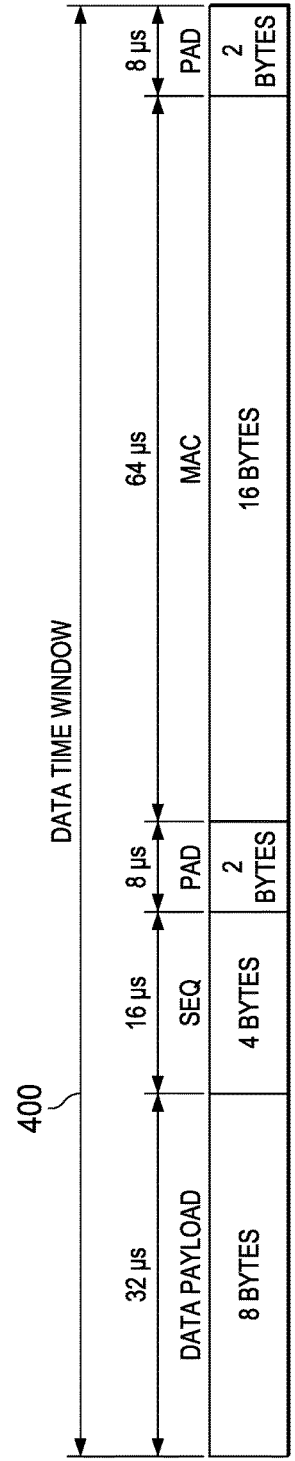
FIG. 4 illustrates an example data payload timing, according to an embodiment.

FIG. 4 illustrates data payload timing, according to an embodiment. In the example shown, an 8 byte data payload, 4 bytes of sequence bits and 2 bytes of pad bits are transmitted on the CAN-FD bus at 2.5625 Mbps during data time window 400 of 128 μs (assuming 500 Kbps CAN bit rate). The 8 bytes of data payload are transferred during the first 32 μs of data time window 400, the 4 bytes of sequence bits are transmitted during the next 16 μs of data time window 400, the 2 bytes of pad bits are transmitted during next 8 μs of data time window 400, the security bits (e.g., a MAC address of the receiving node) are transmitted during the next 64 μs of data time window 400 and finally 2 bytes of pad bits are transmitted during the last 8 μs of data time window 400.

Example Transmitting Process

Figure 5:
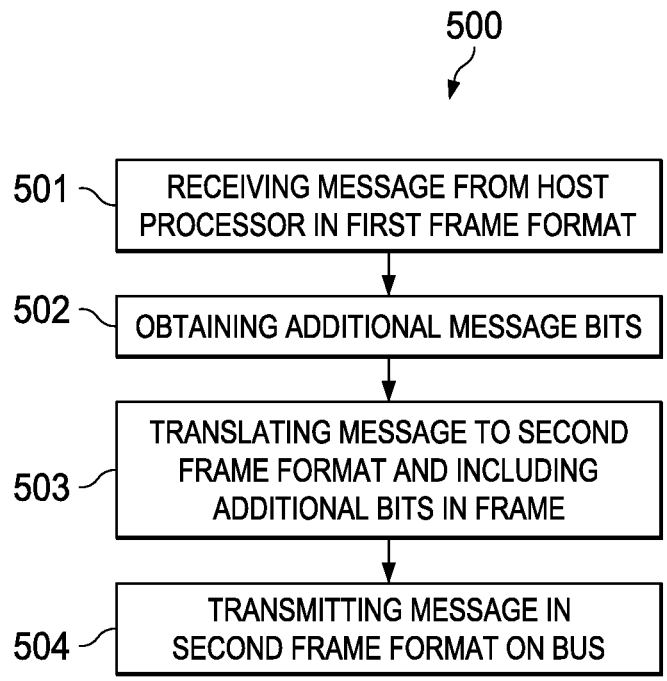
FIG. 5 is a flow diagram of an example transmitting process performed by a translator, according to an embodiment.

FIG. 5 is a flow diagram of an example transmitting process 500 performed by a translator, according to an embodiment. In an embodiment, process 500 can begin by receiving a message from a host processor in a first frame format (501).

Process 500 can continue by obtaining additional bits (502). The additional bits can comprise security data, such as sequence bits representing a binary counter and a MAC address. The message to be transmitted can be obtained from the host processor over an out-of-band bus (e.g. SPI, I2C) and stored before the message is transmitted on the bus. This allows the translator time to pre-compute the additional bits so that all of the message bits are ready to be transmitted on the bus at the same time the first data bit is sent by the host processor to the transceiver for transmission on the bus.

Process 500 can continue by translating the message from the first frame format to the second frame format and including the additional bits (503). For example, the additional security bits (e.g., sequence bits, MAC address) can be added to the message frame as shown in FIGS. 3 and 4.

Process 500 can continue by transmitting the message in the second format on a bus (504). The transmitting includes transmitting the message at a second bit rate during a data time window of the first frame format, where the second bit rate is different (e.g., faster) than the first bit rate. In an embodiment, the sequence and pad bits (if any) can be transmitted on the bus during an initial portion of a data window indicated by the network protocol. When the transceiver has received a sufficient number of bits from the host processor, then the entire message can start to be transmitted on the bus. During a CRC time window, both the final security bits and then the CRC bits can be transmitted on the bus, as described in reference to FIGS. 3 and 4.

Example Receiving Process

Figure 6:
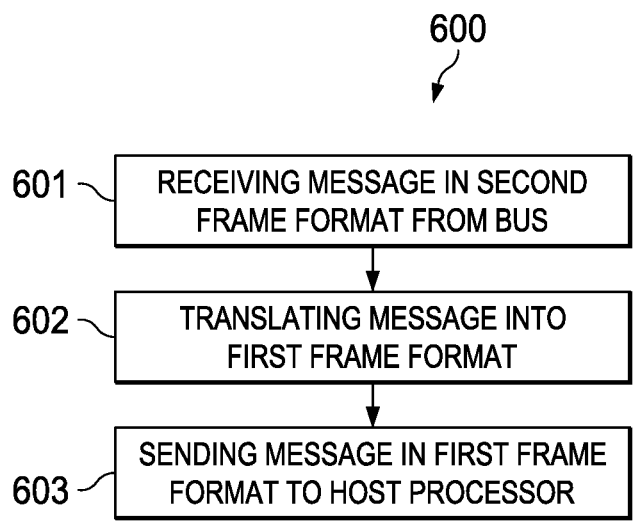
FIG. 6 is a flow diagram of an example receiving process performed by a translator, according to an embodiment.

FIG. 6 is a flow diagram of an example receiving process 600 performed by a packet translator, according to an embodiment. In an embodiment, process 600 can begin by receiving the message in a second frame format from the bus (601), translated the message into a first frame format (602) and sends the message in the first frame format to a host processor (603). For example, in the case of a CAN-FD bus, a translator coupled to the CAN-FD bus receives the message on the bus and forwards the message to a bus controller. The bus controller processes the message to determine if the message includes additional bits (e.g., determine if the data payload is secure). This can be done, for example, by checking a reserved bit r0 in a control field at the start of the message frame to see if it is set (e.g., set to "1"). If the message does not include additional bits, the bus controller passes the message to a microcontroller for further processing without translating the message. In an embodiment, the message can be loaded in a register by the bus controller. The bus controller then sends an interrupt request to the microcontroller so that the message can be fetched from the register by the microcontroller.

If the message includes additional bits, the translator translates the message into a format that that is expected by the host processor. If the additional bits comprise security data, the additional bits are used by the host processor to authenticate the message. In an embodiment, the translator itself authenticates the message and only passes it on if it is authentic. This allows security to be added without changing the host software or hardware.

In an embodiment, sequence, pad and security bits are included in the message. When the packet is first received from the bus some of the bits (e.g., error detecting bits) are transmitted to the host processor during the time that the sequence, pad and security bits in the message are being received. If the sequence and security bits are verified, the error detecting bits are re-calculated and sent to the host processor. If an error is detected, an error frame is transmitted on the bus.

The foregoing embodiments can be augmented with additional features. For example, the size of the sequence and/or security fields can be truncated depending on the security required. The size of the sequence and/or security fields can be truncated depending on the size of the CAN 2.0 message. When few bytes are transferred on, for example, USB 2.0, then less time remains for transmission of security bytes and/or computation. The translator can create, update and/or configure the operation of the system to determine which messages should be passed through without security versus those for which security is needed. The translator can include a secure test mode in which additional messages are passed through without translation for test and validation operations. In an embodiment, the translator can be integrated into the transceiver as shown in FIG. 2 or can be a separate block. The integrated device can include one or more silicon dies in the same package.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A device comprising:
 a host processor configured to process messages for transmission on a data bus;
 a translator coupled to the data bus and configured to:
  receive a message frame from the host processor over an interface, the message frame having a first frame format that is configured to be transmitted on the data bus within a data time window at a first data rate;
  translate the message frame into a translated message frame having a second frame format, the second frame format including data bits representing a message, sequence bits representing a binary counter to a prevent relay attack, pad bits to fill out the translated message frame and allow bit alignment and security bits to detect if the data bits were modified between transmitting and receiving nodes coupled to the data bus by an unauthorized transmitter coupled to the data bus, the second frame format configured to be transmitted on the data bus within the data time window at a second data rate higher than the first data rate; and
 during the data time window, placing the data bits on the data bus, followed by the sequence bits, followed by a first portion of the pad bits, followed by the security bits, followed by a second portion of the pad bits.

2. The device of claim 1, wherein at least one of the sequence bits and the pad bits are placed on the data bus while at least one of the data bits is being received by the translator from the host processor across the interface.

3. The device of claim 1, wherein at least one of the security bits and error code bits in the translated message frame are placed on the data bus during an error code time window of the message frame.

4. The device of claim 1, wherein the data bus is a Controller Area Network (CAN) bus.

5. The device of claim 1, wherein the device is further configured to:
 prior to transmitting the data bits on the data bus:
  transfer the data bits to the translator; and
  compute, by the translator, the security bits based on the data bits.

6. The device of claim 1, wherein the translator is integrated with a bus transceiver.

7. The device of claim 1, wherein the security bits comprise a message authentication code (MAC).

8. A non-transitory, computer-readable storage medium having instructions stored thereon, which, when executed by one or more processors, causes the one or more processors to perform operations comprising:
 receiving a message frame from the host processor over an interface, the message frame having a first frame format that is configured to be transmitted on a data bus within a data time window at a first data rate;
 translating the message frame into a translated message frame having a second frame format, the second frame format including data bits representing a message, sequence bits representing a binary counter to a prevent relay attack, pad bits to fill out the translated message frame and allow bit alignment and security bits to detect if the data bits were modified between transmitting and receiving nodes coupled to the data bus by an unauthorized transmitter coupled to the data bus, the second frame format configured to be transmitted on the data bus within the data time window at a second data rate higher than the first data rate; and during the data time window, placing the data bits on the data bus, followed by the sequence bits, followed by a first portion of the pad bits, followed by the security bits, followed by a second portion of the pad bits.

9. The computer-readable storage medium of claim 8, wherein at least one of the sequence bits and the pad bits are placed on the data bus while at least one of the data bits are being received by the translator from the host processor across the interface.

10. The computer-readable storage medium of claim 8, wherein at least one of the security bits and error code bits in the translated message frame are placed on the data bus during an error code time window of the message frame.

11. The computer-readable storage medium of claim 8, wherein the data bus is a Controller Area Network (CAN) bus.

12. The computer-readable storage medium of claim 8, wherein prior to transmitting the data bits on the data bus:
transferring the data bits to the translator; and
computing, by the translator, the security bits based on the data bits.

13. The computer-readable storage medium of claim 8, wherein the security bits comprise a message authentication code (MAC).

14. A method comprising:
receiving a message frame from the host processor over an interface, the message frame having a first frame format that is configured to be transmitted on a data bus within a data time window at a first data rate;
translating the message frame into a translated message frame having a second frame format, the second frame format including data bits representing a message, sequence bits representing a binary counter to a prevent relay attack, pad bits to fill out the translated message frame and allow bit alignment and security bits to detect if the data bits were modified between transmitting and receiving nodes coupled to the data bus by an unauthorized transmitter coupled to the data bus, the second frame format configured to be transmitted on the data bus within the data time window at a second data rate higher than the first data rate; and during the data time window, placing the data bits on the data bus, followed by the sequence bits, followed by a first portion of the pad bits, followed by the security bits, followed by a second portion of the pad bits.

15. The method of claim 14, wherein the data bus is a Controller Area Network (CAN) bus.

16. The method of claim 14, wherein the security bits comprise a message authentication code (MAC).

17. The method of claim 14, wherein at least one of the sequence bits and the pad bits are placed on the data bus while at least one of the data bits are being received by the translator from the host processor across the interface.

18. The method of claim 14, wherein at least one of the security bits and error code bits in the translated message frame are placed on the data bus during an error code time window of the message frame.

19. The method of claim 14, further comprising:
transferring the data bits to the translator; and
computing, by the translator, the security bits based on the data bits.

20. The method of claim 19, further comprising:
caching, by the translator, the data bits; and
synchronizing, by the translator, the data bits in the message frame and translated message frame by matching control fields in the message frame and the translated method frame.

* * * * *